United States Patent Office 3,719,740
Patented Mar. 6, 1973

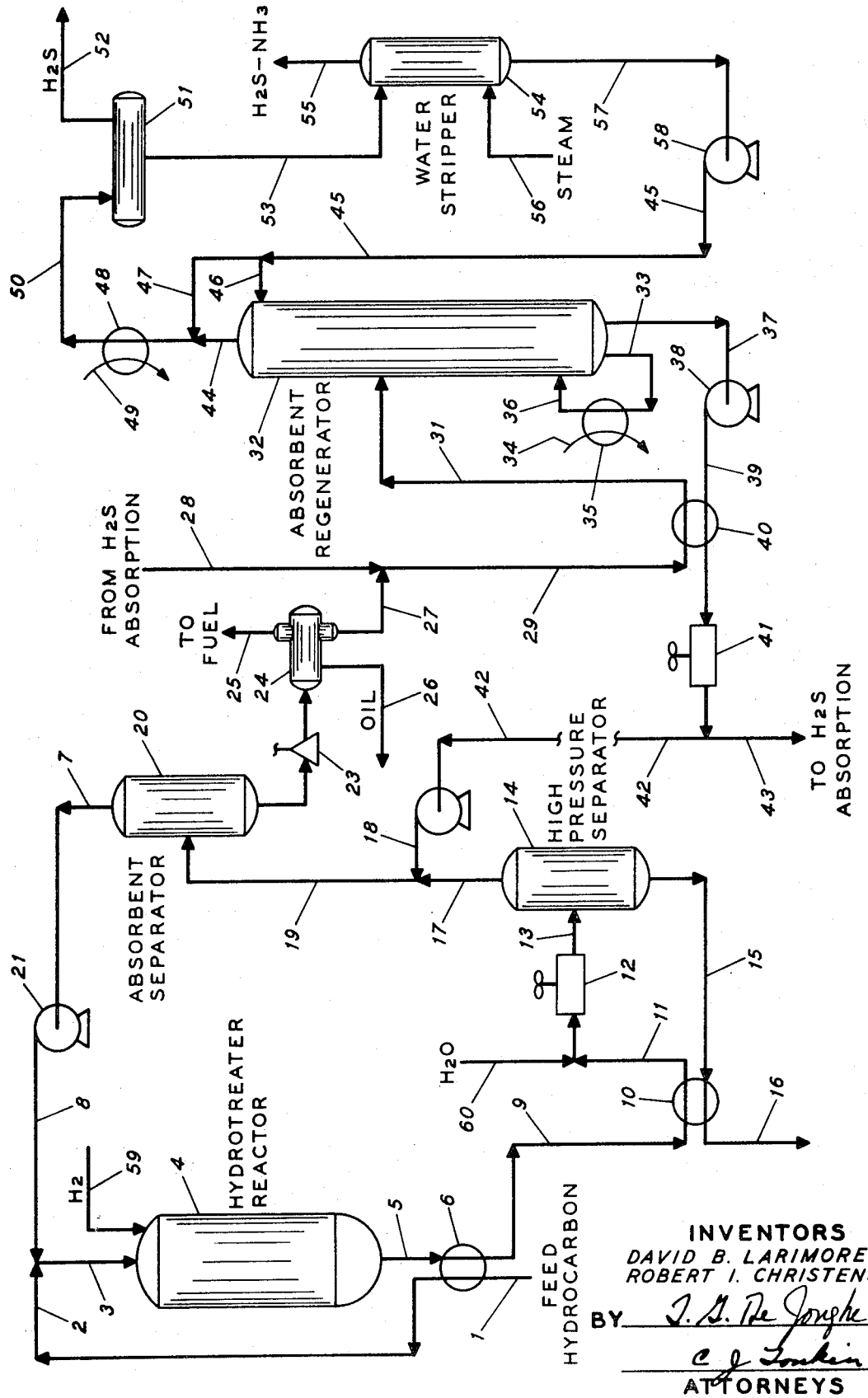

3,719,740
PURIFICATION OF HYDROGEN
David B. Larimore, Berkeley, and Robert T. Christensen, San Rafael, Calif., assignors to Chevron Research Company, San Francisco, Calif.
Filed Nov. 16, 1970, Ser. No. 89,674
Int. Cl. C01b 17/04
U.S. Cl. 423—228                                         5 Claims

ABSTRACT OF THE DISCLOSURE

The present invention is directed to an improved absorbent regeneration process for use in an overall hydrotreating process. In the overall hydrotreating process hydrogen-rich recycle gas is contacted with an aqueous absorbent to absorb $H_2S$ and $NH_3$ and the $H_2S$ and $NH_3$ are stripped from the absorbent in a regenerator vessel and removed together with water vapor as an overhead stream via the overhead line from the top of the regenerator vessel. The improvement which is made in the absorbent regeneration process includes the following steps:
(a) injecting a recirculating water stream into the top of the regenerator vessel or into the overhead line from the top of the regenerator vessel so as to absorb $NH_3$;
(b) cooling the overhead stream so as to condense $H_2O$, passing the cooled overhead stream to an overhead separator vessel;
(c) withdrawing a gaseous stream of $H_2S$ containing less than 5 percent $NH_3$ from the separator;
(d) withdrawing a liquid stream comprising $H_2O$, $NH_3$, and $H_2S$ from the separator; and
(e) stripping $H_2S$ and $NH_3$ from the liquid stream to obtain a purified water stream which is recirculated and injected into the regenerator overhead system as aforesaid to absorb $NH_3$.

BACKGROUND OF THE INVENTION

The present invention relates to the purification of recycle hydrogen for a hydroconversion process such as hydrotreating or hydrocracking. More particularly, the present invention relates to the removal of both $H_2S$ and $NH_3$ from recycle hydrogen gas and to methods for avoiding plugging of hydrotreater reactor effluent piping and exchangers and to particular means of recovering the $NH_3$ and $H_2S$ removed from the recycle hydrogen gas.

In many hydrogenative conversion processes applied to hydrocarbon oils, of which catalytic hydrogenation, hydrofining or hydrodesulfurization, and hydrocracking are typical examples, $H_2S$ and $NH_3$ are produced as a result of reaction of hydrogen with sulfur compounds and nitrogen compounds contained in the oil. Sometimes this conversion of one or the other or both of the sulfur and nitrogen compounds is the desired reaction, while in other cases it is merely an incidental reaction. In a typical process normally liquid hydrocarbon oil containing nitrogen compounds and sulfur compounds, and recycle hydrogen-rich gas and makeup hydrogen, are passed through a reaction zone, usually containing a catalyst, at elevated temperature and pressure at which at least a portion of the hydrocarbons are vaporized, and there is obtained as a reaction zone effluent a mixture of vaporized hydrocarbons, hydrogen, $H_2S$ and $NH_3$. The effluent may also contain heavier hydrocarbons which are liquid at the reaction conditions. The reaction effluent is cooled to condense vaporized hydrocarbons, whereby the liquid hydrocarbons can then be separated from hydrogen-rich recycle gas, which is then reused in the process.

In many instances, it has been common practice to permit the $H_2S$ to build up in the recycle hydrogen to concentrations such that their partial pressures become high enough that the net production of $H_2S$ thereafter will completely dissolve in the liquid hydrocarbons separated from equilibrium with the recycle gas. This reduces the hydrogen partial pressure in the reaction zone unless a correspondingly higher total pressure is used, in which case the costs of building and operating the process are significantly higher. To restrict the concentration build-up of $H_2S$ in recycle gas, a portion of the recycle gas may be bled from the system. Then, however, more makeup hydrogen is needed, which may be no less costly than using a high enough pressure so that no bleed in needed. In any event, it is necessary to remove the $NH_3$ (usually by water scrubbing) from the reactor effluent in order to prevent formation of solid $NH_4SH$ deposits with resultant plugging.

Various methods have been proposed for removing the $H_2S$ from the recycle hydrogen and also for removing the $NH_3$ and $H_2S$ from the reactor effluent material before the recycle hydrogen is separated from the reactor effluent hydrocarbons.

For example, in accordance with the process disclosed in U.S. Pat. 3,340,182, $NH_3$ and $H_2S$ are removed from a hydroconversion reactor effluent by scrubbing the effluent with water to which is added another stream containing more of one of the by-products, so that an ammonium bisulfide aqueous solution is formed containing essentially all the $NH_3$ and $H_2S$.

It has generally been considered necessary in accordance with modern hydroconversion technology to remove at least some of the $NH_3$ and $H_2S$ from the hydroconversion reactor effluent by water wash or water injection ahead of the high pressure separator (i.e., the separator in which recycle hydrogen gas is separated from condensed reactor effluent hydrocarbons) in order to avoid salt fouling and plugging problems in the lines and heat exchangers between the reactor effluent withdrawal point and the high pressure separator, particularly those points in the lines and exchangers which are below about 300° or 200° F. It has been found that on cooling reactor effluent containing both $H_2S$ and $NH_3$ to temperatures below about 300° F., the $H_2S$ and $NH_3$ may react to form salts (herein referred to as $NH_4SH$) which sometimes may cause clogging problems in the heat exchangers and lines, as previously indicated. Injection of water into the reaction effluent upstream of the heat exchangers has been used to wash out such deposits and/or to prevent their forming. This water injection can provide means of removing much of the $NH_3$ formed if rather large amounts of water are injected sufficient to dissolve the $NH_3$. However, rarely will more than equal molar amounts of $H_2S$ with reference to the dissolved $NH_3$ also dissolve in the water. U.S. patents wherein water injection into the reactor effluent is discussed include U.S. Pat. 3,157,590, U.S. Pat. 3,335,071, and U.S. Pat. 3,356,608.

U.S. Pat. 3,172,843 is a typical reference directed to a hydrodesulfurization process and disclosing injection of water into the reactor effluent lines so as to absorb $NH_3$ and some $H_2S$ and wherein an alkanolamine absorption step is also used to scrub primarily $H_2S$ from the recycle hydrogen-rich gas.

Various means have been disclosed for handling the alkanolamine absorbent used to remove $H_2S$ from the recycle hydrogen-rich gas. For example, U.S. Pat. 3,380,910 discloses that the hydrogen sulfide laden absorbent can be processed by heating at reduced pressure to evolve concentrated hydrogen sulfide gas and produce a regenerated solution which is recycled for further $H_2S$ absorption. The hydrogen sulfide gas, of course, may be used to produce elemental sulfur by the Claus process.

In general, the removal of weakly acidic gases such as carbon dioxide and hydrogen sulfide from mixed gas streams such as synthesis gas or natural gas is commonly accomplished by scrubbing the gas stream with an aqueous solution of an alkaline absorbent. Typical absorbents consist of aqueous solutions of potassium carbonate or monoethanolamine (MEA). The scrubbing solution containing the dissolved acid gas component is regenerated by heating in a distillation column. Steam or process gases may be used to heat the liquid at the base of the column. This heat may be supplied indirectly, by means of a reboiler, or directly by the introduction of steam into the column. The heated liquid, largely freed of absorbed acidic gases, leaves the bottom of the column and is recycled for further gas scrubbing.

SUMMARY OF THE INVENTION

According to the present invention, an improved process is provided for the operation of a hydrotreating process and the handling of $H_2S$ and $NH_3$ removal from recycle hydrogen gas in a hydrotreating process and particularly, for carrying out the separation of the $H_2S$ and $NH_3$ from the absorbent used to remove $H_2S$ and $NH_3$ from the recycle hydrogen gas. According to the present invention, in a hydrotreating process wherein a hydrocarbon feedstock containing organic sulfur and organic nitrogen compounds is contacted at elevated temperature and pressure and in the presence of hydrogen with hydrotreating catalyst in a hydrotreating reactor to form an effluent comprising hydrocarbons, hydrogen sulfide, ammonia and hydrogen and wherein the effluent is withdrawn from the reactor and cooled and passed to a high pressure separator wherein hydrocarbons are separated from a hydrogen-rich gas stream and wherein the separated hydrogen-rich gas stream is recycled at least in part to the hydrotreating reactor, and wherein hydrogen-rich recycle gas is contacted with an aqueous absorbent to absorb $H_2S$ and $NH_3$ and wherein the $H_2S$ and $NH_3$ are stripped from the absorbent in a regenerator vessel and removed together with water vapor as an overhead stream via an overhead line from the top of the regenerator vessel, the improvement is made which comprises injecting a recirculating water stream into the top of the regenerator vessel or into the overhead line from the top of the regenerator vessel so as to absorb $NH_3$, cooling the overhead stream so as to condense $H_2O$, passing the cooled overhead stream to an overhead separator vessel, withdrawing a gaseous stream of $H_2S$ containing less than 5 percent $NH_3$ from the separator, withdrawing a liquid stream comprising $H_2O$, $NH_3$, and $H_2S$ from the separator, stripping $H_2S$ and $NH_3$ from the liquid stream to obtain a purified water stream which is recirculated and injected into the regenerator overhead system as aforesaid to absorb $NH_3$. Preferably, the gaseous stream of $H_2S$ withdrawn from the separator contains less than 100 p.p.m. by volume $NH_3$ to permit processing of the $H_2S$ gaseous stream in a conventional Claus sulfur plant as opposed to a modified Claus sulfur plant suitable for the handling of an $H_2S$ stream containing substantially larger amounts of $NH_3$.

In the present specification, the term "hydrotreating" is used to mean those hydroconversion processes wherein $NH_3$ and $H_2S$ are formed during the treatment of hydrocarbon feedstocks at elevated temperatures and pressures with hydrogen. Typically, the hydrotreating reaction is carried out in the presence of catalyst particles such as Group VI and Group VIII metal components impregnated on refractory supports or cogelled together with refractory support material such as alumina or silica-alumina.

The term "hydrotreating" is used herein in some distinction to hydrocracking reactions as hydrocracking in many instances is carried out with previously hydrotreated feedstocks containing essentially no organic nitrogen and sulfur or only a few parts per million or organic nitrogen and sulfur so that the process of the present invention has little application. The process of the present invention is primarily concerned with feedstocks having a few tenths percent sulfur and nitrogen or more. The present invention is preferably applied to heavy oils containing at least 0.5 weight percent sulfur and at least 0.05 weight percent nitrogen, both being present in the feedstocks as organic compounds. Particularly preferred heavy oil feedstocks include whole crude oils, reduced crudes, vacuum residua, solvent deasphalted oils, vacuum gas oils, and shale oils. The process of the present invention is particularly advantageously applied to Arabian and other middle-eastern crude oils and crude oil fractions having a relatively high organic sulfur content as opposed to California crudes, for example, having a relatively low sulfur content and higher organic nitrogen content.

The process of the present invention is particularly advantageous in that a highly attractive overall process combination is provided wherein $H_2S$ and $NH_3$ are both removed from the recycle gas to a hydrotreating process and the absorbent used to remove the $H_2S$ and $NH_3$ is regenerated in a system so that the $H_2S$ and $NH_3$ removed from the recycle hydrogen gas can be used as a feedstream to a modified Claus process for the production of sulfur. The process of the present invention is related to our concurrently filed application U.S. Ser. No. 89,673, entitled "Hydrogen Purification," which application is incorporated by reference into the present specification.

The process of the present invention is most preferably carried out in combination with no water injection into the hydrotreater reactor effluent and with the $NH_3$ and $H_2S$ partial pressures and the temperature in the reactor effluent piping and exchangers for the final cooling ahead of the high pressure recycle hydrogen gas separator being maintained above the sublimation condition of $NH_4SH$ as is discussed in more detail in our concurrently filed application entitled "Hydrogen Purification." However, the process of the present invention can be carried out advantageously in combination with some water injection into the reactor effluent lines, particularly, water injection immediately ahead of the final heat exchanger or cooler before the high pressure separator. When using water injection into the reactor effluent, preferably the water is injected before the reactor effluent is cooled below 150° F. and more preferably, before the reactor effluent is cooled below about 300 or 200° F.

Various absorbents can be used in the process of the present invention, but alkanolamine absorbents together with water are preferred absorbents for removing both $H_2S$ and $NH_3$ from the recycle hydrogen gas. Particularly preferred absorbent solutions for use in the process of the present invention comprise solutions of an alkanolamine with water, most preferably relatively dilute solutions containing less than 30 weight percent MEA in the MEA-water solution, such as solutions of 15 percent or less MEA in water. Contrasted to the use of other aqueous absorption media such as aqueous ammonia as an absorbent for the recycle hydrogen gas, the aqueous solutions of alkanolamine (particularly MEA-water) were found to have a decided advantage in terms of absorbent solution circulation rate in order to obtain a high degree of $NH_3$ and $H_2S$ removal.

Preferably, the hydrocarbon feedstock which is hydrotreated in the process of the present invention contains nitrogen and sufficient sulfur as organic compounds, and is hydrodesulfurized under sufficiently mild conditions, so as to produce a hydrotreating reactor effluent containing at least three moles $H_2S$ per each mole $NH_3$. Operating in accordance with the above-indicated general conditions is advantageous in the process of the present invention in that a relatively pure $H_2S$ stream can be produced.

BRIEF DESCRIPTION OF THE DRAWING

The figure is a schematic process flow diagram illustrating preferred embodiments of the present invention.

DETAILED DESCRIPTION

Referring more particularly to the figure, feed hydrocarbon is introduced to the process via line 1. As previously indicated, the feed hydrocarbon is preferably a heavy oil such as a resid stock containing a substantial amount of sulfur but also containing at least some organic nitrogen compounds. Preferably, at least 50 percent of the hydrocarbon feedstock boils above 800° F. Before introduction to hydrotreater reactor 4, the feed hydrocarbon stream can be exchanged with reactor effluent in heat exchanger 6. The preheated feed hydrocarbon is then withdrawn from exchanger 6 via line 2 and after combination with recycle hydrogen via line 8 is passed via line 3 to hydrotreating reactor 4.

Operating conditions for the hydrotreater usually include a temperature between about 600 to 900° F., a pressure between about 200 and 6,000 p.s.i.g., a hydrogen gas rate of about 500 to 10,000 s.c.f. per barrel of feed hydrocarbon, a liquid hourly space velocity of about 0.1 and 10.0, and the use of catalyst particles comprising Group VI and/or Group VIII metal components together with a refractory material such as alumina or silica-alumina. As indicated previously, according to a preferred embodiment of the present invention, the present invention is carried out with feedstocks and under reaction conditions which are suitable to produce a reactor effluent containing more $H_2S$ than $NH_3$. Thus, advantageous feedstocks include middle-eastern feedstocks, particularly middle-eastern reduced crude or vacuum residuum containing a relatively high amount of sulfur as opposed to California crude oil or crude oil fractions, for example, containing a smaller amount of sulfur and relatively large amount of organic nitrogen.

In the case of either high sulfur or high nitrogen content feedstocks and particularly with feedstocks wherein there is not a relatively large amount of organic sulfur compared to organic nitrogen, preferably the reaction conditions are adjusted so as to favor the desulfurization of the feed as opposed to the denitrification of the feed. In general, the sulfur is more easily removed than the organic nitrogen and thus, relatively mild hydroconversion conditions are preferred and the use of a less acidic hydroconversion catalyst is preferred. Thus, whereas temperatures between 750° and 850° F. may be favored for hydrodenitrification of a particular feedstock, when primarily hydrodesulfurization is desired, less severe temperatures between about 700° and 800° F. would be preferred. Also, pressures which are 10 to 50 percent lower and space velocities which are 10 to 100 percent higher than used for hydrodenitrification are preferably used for hydrodesulfurization of a given feedstock.

Catalysts containing a relatively low amount of silica or no silica such as Group VI and Group VIII components on alumina with only a few percent silica or with no silica are preferred for primarily hydrodesulfurization reactions as opposed to catalysts having a higher acidity due to the presence of more silica. Also, it is usually desirable to use a catalyst which is substantially free of fluoride or other halides as these have a tendency to increase the acidity of the catalyst and result in a catalyst less advantageous for mild hydrodesulfurization. Suitable catalysts include catalysts comprising alumina with a nickel and molybdenum component. For example, U.S. Pat. 3,493,517 is directed to and discloses hydrodesulfurization catalyst compositions which are particularly suitable for use in the process of the present invention.

The hydrotreating reaction effluent is withdrawn from hydrotreater reactor 4 via line 5 in the schematic process flow diagram. It is usually preferred to use a fixed bed reaction system, i.e., with the catalyst being held in place in fixed catalyst beds. However, fluidized systems can also be used wherein the catalyst is fluidized or ebullated by upward flowing reactants. In the case of either fixed catalyst beds or fluidized catalyst masses, the effluent may be withdrawn from the reactor at various positions, usually the bottom of the reactor in the case of fixed catalyst beds and usually the top or upper part of the reactor in the case of fluidized reaction systems. Regardless of where the point of withdrawal from the hydrotreater reactor is located, the reactor effluent must be cooled in order to facilitate separating recycle hydrogen-rich gas from product hydrotreated hydrocarbons.

In some cases, it is advantageous to include a high temperature (400–600° F.) flash drum after the effluent has been partially cooled (as in line 9). The hot liquid from this drum flows directly to distillation. The vapor is further cooled and scrubbed to remove $H_2S$ and $NH_3$ in accordance with the process of the present invention.

In the schematic process flow diagram, the reactor effluent is cooled in exchanger 6, then passed via line 9 to exchanger 10 wherein it is further cooled and then passed via line 11 to exchanger 12 wherein the reactor effluent is still further cooled by exchange, for example, with ambient air in fin fan cooler 12.

The reactor effluent withdrawn via line 5 from the hydrotreater reactor is composed primarily of vaporized and/or liquid hydrocarbons, hydrogen, $H_2S$ and $NH_3$. Usually, the cooling which takes place in the first exchangers, for example, exchangers 6 and 10, will not be sufficiently great to cause a high probability of $NH_4SH$ salt deposition. However, the lower temperatures which are reached in the subsequent exchanger, for example, exchanger 12, will be close to those at which depositon of solid $NH_4SH$ can occur. In many prior processes, instead of an air cooler for exchanger 12, exchange with cooling water is used as the final exchanger before the high pressure separator. In the use of either air exchangers or cooling water exchangers, the reactor effluent flowing through the tubes in the final heat exchanger is typically cooled to a temperature in the range of 80°–200° F. while it is flowing through the exchanger tubes.

Water may be injected via line 60 into line 11 to aid in the prevention of the formation of solid $NH_4SH$ salts and to wash $NH_3$ and approximately an equal molar amount of $H_2S$ out of the reactor effluent stream.

However, it is preferred in the process of the present invention to omit water injection via line 60 into line 11, and it is preferred to scrub at least 90 volume percent of both the $NH_3$ and the $H_2S$ from the recycle hydrogen-rich gas and operate above the sublimation condition for $NH_4SH$ as is explained in detail in our concurrently filed application entitled "Hydrogen Purification."

Referring again more particularly to the FIG. 1 flow diagram, cooled and condensed liquid hydrocarbons are withdrawn from the bottom of high pressure separator 14 via line 15 and after passage through exchanger 10 are sent to further treatment via line 16. The further treatment can consist of a low pressure separator followed by distillation facilities or in some instances, the low pressure separator is preferably omitted and the liquid hydrocarbons from the reactor are sent directly to distillation to separate out product material such as gasoline cuts or feedstocks suitable for further processing such as hydrocracking or catalytic cracking to prepare gasoline, jet fuel, or lubricating oil products from the hydrotreated material. Whether the hydrotreater reactor effluent liquid hydrocarbons are passed to a low pressure separator or directly to distillation facilities, there will be some $H_2S$ which flashes off from the liquid hydrocarbons when the pressure on the liquid hydrocarbons is reduced from the pressure of about 1,000 to 3,000 p.s.i.g. prevailing in high pressure separator 14 to pressures of the order of 200 p.s.i.g. used in the distillation facilities. The dissolved $H_2S$ which flashes off from the liquid hydrocarbons as the pressure is lowered can advantageously be removed by the recycle gas absorbent mixture as indicated in line 43. Thus, according to the present invention, the same absorbent which is used to remove $H_2S$ and $NH_3$ from the recycle hydrogen-rich gas is preferably used to remove $H_2S$ which flashes off from the hydrotreater reactor effluent liquid hydrocarbons on reducing the pressure up to about 100 to 500 p.s.i.g. and for absorption of other possible H₂S streams in the associated refinery processing units. The H₂S-lean absorbent is passed to these various H₂S absorption services via line 43 and returned to the absorbent regeneration facilities via line 28.

The hydrogen-rich recycle gas for hydrotreater 4 is withdrawn from high pressure separator 14 via line 17. Lean absorbent is injected via line 18 into the recycle gas withdrawn from the high pressure separator via line 17. The lean absorbent is contacted with the hydrogen-rich gas so as to absorb H₂S and NH₃ present in the recycle hydrogen gas. Although the absorption may be carried out simply by in-line injection and subsequent contacting, the absorption may also be carried out in a scrubbing or contacting vessel and then passed via line 19 to absorbent separator 20.

Purified hydrogen-rich gas is withdrawn via line 7 from separator 20. Preferably, at least 95 volume percent of both the H₂S and NH₃ are removed from the recycle hydrogen-rich gas and more preferably, at least 98 volume percent of the H₂S and NH₃ are removed. The purified hydrogen-rich gas is passed via line 7 to recycle compressor 21 which boosts up the pressure by about 200–300 p.s.i. to compensate for the pressure drop in the hydrogen recycle loop. The recycle hydrogen is then passed via line 8 and line 3 to the hydrotreater reactor and, together with fresh or make-up hydrogen added via line 59, is used for the hydrotreating reactions carried out in reactor 4.

Preferred absorbents for removing H₂S and NH₃ from the recycle gas are alkanolamines such as monoethanolamine (MEA), diethanolamine (DEA), and trialkanolamines, such as triethanolamine. Monoethanolamine and diethanolamine are particularly preferred and it is particularly preferred to use the MEA or DEA together with water, preferably in a relatively dilute solution containing less than 30–35 weight percent MEA based on the combined weight of the MEA and water. MEA and DEA are very effective for the absorption of H₂S and the water is effective for absorbing NH₃, particularly in the presence of H₂S, as the H₂S readily dissolves in the water due to relatively high solubility in the amine-water mixture.

The H₂S-NH₃-rich absorbent is removed from the bottom of separator 20 and after expansion in power recovery turbine 23 is passed to separator 24. In separator 24, light gases are removed as indicated via line 25 and oil is skimmed off and removed as indicated via line 26. The preferred aqueous absobent rich in H₂S and NH₃ is passed via line 27 and 29 together with H₂S-rich absorbent recycled via line 28 from other H₂S absorption services to heat exchanger 40 prior to introduction to absorbent regenerator 32 via line 31.

In absorbent regenerator 32, the absorbent is regenerated by stripping gases or by reboiling as indicated in FIG. 1 by reboiler 35. Heat is added to reboiler 35, for example, by steam passed through the reboiler via line 34 and exchanged with absorbent material circulated via lines 33 and 36. The stripped absorbent is withdrawn from the bottom of the regenerator via line 37 and then is pumped up to higher pressure via line 38 and passed via line 39 through exchangers 40 and 41 to lines 41 and 43. Part of the regenerated absorbent is then passed via line 43 to various H₂S absorption services. Another part of the absorbent is passed via line 42 and then 18 for contacting with the H₂S-NH₃ contaminated recycle hydrogen-rich gas.

The H₂S and NH₃ which are stripped from the absorbent in absorbent regenerator 32 are removed from the top of regenerator 32 via line 44. In accordance with a particularly preferred overall process embodiment of the present invention, the H₂S and NH₃ stream removed from the top of the regenerator is contacted with recirculated water introduced via line 46 to the upper or top part of the regenerator and more preferably, via line 47 to the overhead line from the regenerator leading to the overhead condenser and then the overhead separating vessel. The overhead removed from the absorbent regenerator via line 44 will contain at least some water vapor, but usually it is preferred to inject some recirculated liquid water to aid in the production of a relatively pure H₂S stream by forming an aqueous phase in overhead separator 51 composed primarily of NH₃ with an equal molar amount of H₂S together with the liquid water. Thus, the overhead from the absorbent regenerator is cooled in exchanger 48, for example, by water flowing through exchanger 48 via line 49 and then cooled effluent from exchanger 48 is then passed via line 50 to the overhead separator vessel 51. A purified H₂S stream containing less than 5 mole percent NH₃ and usually less than about ½ to 1 mole percent NH₃ is withdrawn via line 52 from the overhead separator vessel.

A liquid aqueous stream containing NH₃ and an equal molar amount of H₂S is withdrawn via line 53 from the overhead separator vessel.

The liquid aqueous solution of H₂S and NH₃ is passed via line 53 to water stripper 54 wherein H₂S and NH₃ are stripped from the aqueous solution with steam or other heating means applied near the bottom of the water stripper. The purified water is removed from the bottom of the water stripper via line 57 and then pumped back to the regenerator overhead system via pump 58 in line 45.

The H₂S-NH₃ stream stripped from the aqueous stream in stripper 54 is removed via line 55. Preferably, the H₂S-NH₃ stream is then burned to form a stream comprising SO₂ and N₂ which can be reacted with the purified H₂S stream in line 52 in a modified Clause plant to form sulfur according to the reaction:

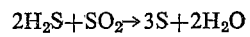

$$2H_2S + SO_2 \rightarrow 3S + 2H_2O$$

Because, as can be seen from the above reaction, 2 moles of H₂S are needed for each mole of SO₂, it is preferable to have at least 3 moles of H₂S per mole of NH₃ in the hydrotreater reactor effluent, so that there will be at least 2 moles of H₂S in the purified H₂S stream removed in the regenerator system via line 52 for each mole of H₂S in the approximately equimolar H₂S-NH₃ stream removed via line 55. Preferably, there is at least about 3½ to 4 or more moles of H₂S per mole of NH₃ in the hydrotreater reactor effluent so that a higher purity H₂S stream can be produced in line 52 by using more water injection into the regenerator overhead system and/or by using ammonia or ammonia-water injection into the over-head system resulting in an increased H₂S-NH₃ stream withdrawn via line 55. To achieve the desired H₂S-NH₃ stream, the hydrotreater feedstock is primarily desulfurized as opposed to denitrified and this feedstock is preferably restricted to feedstocks containing at least 2 or more atoms S per atom N, the S and N being present in the feedstock as organic compounds.

The solids which are formed from the NH₃ and H₂S reaction are herein generally referred to as NH₄SH, but it is to be understood that this is only the believed for of the solid reaction product from the NH₃-H₂S reaction and other solids may be formed.

Exemplary conditions employing the process of the present invention for the hydrodesulfurization of a Kuwait atmospheric residuum from about 3 weight percent sulfur to about 1.0 weight percent sulfur are as follows. Residuum is contacted with a hydrotreating catalyst in a reactor at an elevated temperature and pressure and in the presence of hydrogen to reduce the sulfur content of the residuum to about 1 weight percent by converting organic sulfur compounds to H₂S and sulfur-free organic compounds. Effluent from the hydrotreating reactor is cooled, by exchange with residuum feed to the reactor, to a temperature of about 475° F. and then passed to a hot high pressure separator. Liquid hydrocarbons are separated from gases and vaporized hydrocarbons in the hot high pressure separator. The light hydrocarbon are passed from the bottom of the separator to distillation facilities. The vaporized hydrocarbons and gases including $H_2S$, $NH_3$, and large quantities of unreacted hydrogen are removed from the top of the hot high pressure separator and then cooled to a temperature between about 140° F. and 160° F. by a fin fan air exchanger. The cooled stream is introduced to a cold high pressure separator at a temperature of about 140° F. and a pressure of about 2,040 p.s.i.g. Condensed liquid hydrocarbons are removed from the bottom of the cold high pressure separator and passed to distillation facilities. The gaseous stream removed from the top of the cold high pressure separator is equivalent to stream 17 in the drawing. The gaseous stream contains $H_2S$ at a partial pressure of about 60 p.s.i.a. and $NH_3$ at a partial pressure of about 6 p.s.i.a. before scrubbing to remove the $H_2S$ and $NH_3$. The $H_2S$ and $NH_3$ are removed from the stream 17 recycle hydrogen by contacting or scrubbing the gaseous stream with an MEA solution or a DEA solution. Using a 15 weight percent MEA solution in water at an MEA solution rate of about 800 gallons per minute through line 18 results in an $H_2S$ and $NH_3$ removal of about 98 percent. Using a 30 weight percent DEA solution at a rate of about 500 gallons per minute results in about 90 volume percent $H_2S$ and $NH_3$ removal from the hydrogen recycle gas.

The water circulation rate via line 45 to the top of the absorbent regenerator 32 is about 100 gallons per minute corresponding to the previously given amine circulation rates and $H_2S$-$NH_3$ recovery.

Although various embodiments of the invention have been described, it is to be understood that they are meant to be illustrative only and not limiting. Certain features may be changed without departing from the spirit or scope of the present invention. It is apparent that the present invention has broad application to the removal of both $NH_3$ and $H_2S$ from recycle hydrogen gas for a hydroconversion process in combination with the production of a relatively pure $H_2S$ stream and an $H_2S$–$NH_3$ stream using water injection into the overhead system of the regenerator for the recycle gas scrubbing solution. Accordingly, the invention is not to be construed as limited to the specific embodiment or examples discussed but only as defined in the appended claims or substantial equivalents of the claims.

We claim:
1. In a hydrotreating process wherein a hydrocarbon feed stock is treated in a hydrotreating reactor and wherein hydrogen-rich recycle gas is contacted with an aqueous absorbent to absorb $H_2S$ and $NH_3$ and wherein the $H_2S$ and $NH_3$ are stripped from the absorbent in a regenerator vessel and removed together with water vapor as an overhead stream via an overhead line from the top of the regenerator vessel, the improvement in the absorbent regeneration process which comprises:
 (a) injecting a recirculating water stream into the top of the regenerator vessel or into the overhead line from the top of the regenerator vessel so as to absorb $NH_3$;
 (b) cooling the overhead stream so as to condense $H_2O$, and passing the cooled overhead stream to an overhead separator vessel;
 (c) withdrawing a gaseous stream of $H_2S$ containing less than 5 percent $NH_3$, from the separator;
 (d) withdrawing a liquid stream comprising $H_2O$, $NH_3$ from the separator;
 (e) stripping $H_2S$ and $NH_3$ from the liquid stream to obtain an $H_2S$-$NH_3$-reduced water stream; and
 (f) recirculating and injecting at least a portion of the $H_2S$-$NH_3$-reduced water stream into the regenerator overhead system as aforesaid to absorb $NH_3$.

2. A process in accordance with claim 1 wherein the hydrocarbon feedstock contains organic nitrogen and sufficient organic sulfur and is hydrodesulfurized under sufficiently mild conditions to produce a hydrotreating reactor effluent containing at least 3 moles $H_2S$ per 1 mole $NH_3$.

3. A process in accordance with claim 2 wherein the $H_2S$-$NH_3$ which is stripped from the liquid stream is combusted with oxygen to obtain $SO_2$ and $N_2$ and the $SO_2$ is reacted with $H_2S$ withdrawn as a gaseous stream from the overhead separator vessel to form sulfur.

4. A process in accordance with claim 1 wherein the absorbent comprises an alkanolamine and water.

5. A process in accordance with claim 1 wherein the effluent from the reactor is cooled below 150° F. and then is passed to a high pressure separator and wherein water is injected into the reactor effluent before the reactor effluent is cooled below 150° F.

References Cited
UNITED STATES PATENTS

| | | | |
|---|---|---|---|
| 3,335,071 | 8/1967 | Bollen et al. | 23—193 X |
| 3,340,182 | 9/1967 | Berkman et al. | 23—181 X |
| 3,417,011 | 12/1968 | Carson | 208—108 |
| 3,518,167 | 6/1970 | Klett | 23—193 X |
| 3,600,283 | 8/1971 | Bollen et al. | 23—193 |

GEORGE O. PETERS, Primary Examiner

U.S. Cl. X.R.

423—238